US005983324A

United States Patent [19]
Ukai et al.

[11] Patent Number: 5,983,324
[45] Date of Patent: Nov. 9, 1999

[54] DATA PREFETCH CONTROL METHOD FOR MAIN STORAGE CACHE FOR PROTECTING PREFETCHED DATA FROM REPLACEMENT BEFORE UTILIZATION THEREOF

[75] Inventors: Toshiyuki Ukai, Sagamihara; Masaaki Shimizu, Hachioji; Fujio Fujita, Yokohama, all of Japan

[73] Assignee: Hitachi, Ltd., Tokyo, Japan

[21] Appl. No.: 08/823,836

[22] Filed: Mar. 25, 1997

[30] Foreign Application Priority Data

Mar. 28, 1996 [JP] Japan ................................ 8-073610

[51] Int. Cl.⁶ .................................................. G06F 12/08
[52] U.S. Cl. ............................ 711/137; 712/207; 711/159
[58] Field of Search ................................... 711/137, 113, 711/159; 395/383, 381; 712/207, 205

[56] References Cited

U.S. PATENT DOCUMENTS

| | | | |
|---|---|---|---|
| 4,882,642 | 11/1989 | Tayler et al. ............................ | 711/137 |
| 5,577,224 | 11/1996 | DeWitt et al. .......................... | 711/137 |
| 5,652,858 | 7/1997 | Okada et al. ........................... | 711/137 |
| 5,721,865 | 2/1998 | Shintani et al. ........................ | 395/383 |

OTHER PUBLICATIONS

"The Design and Implementation of the 4.3 BSD UNIX Operating System," Addison–Wesley Publishing Company, Inc., pp. 29–37, 172–177, 191–193 and 208–211 (1989).

"Extent–Like Performance from a UNIX File System," Proceedings of the Winter 1991, USENIX Conference, pp. 33–43, (1991).

*Primary Examiner*—Eddie P. Chan
*Assistant Examiner*—Yamir Encarnación
*Attorney, Agent, or Firm*—Fay, Sharpe, Beall, Fagan, Minnich & McKee

[57] ABSTRACT

When the OS judges that a read request to the secondary storage device from the user process is the sequential access, the OS judges whether prefetching is to be stopped before the data succeeding to the data designated by the request is prefetched, so as to decrease replacement of data prefetched to the main memory by other data before the data is used. The judgment is executed to prevent that succeeding data from being replaced by other data after the succeeding data is prefetched to the cache area in the main memory. That is, it is judged whether the data requested by the read request has already been prefetched, and has already been replaced by other data before the requested data is used by the user process, if the requested data has been prefetched. When these two conditions are met, prefetch is useless. The prefetching accompanying this read request is not executed, the prefetch stop flag is set, and prefetching is prohibited to the succeeding sequential access by this prefetch stop flag. The technology is also disclosed which controls allocation of the cache entries so that a cache entry which holds prefetched data is not used to hold other data before the data is used.

14 Claims, 10 Drawing Sheets

FIG. 6
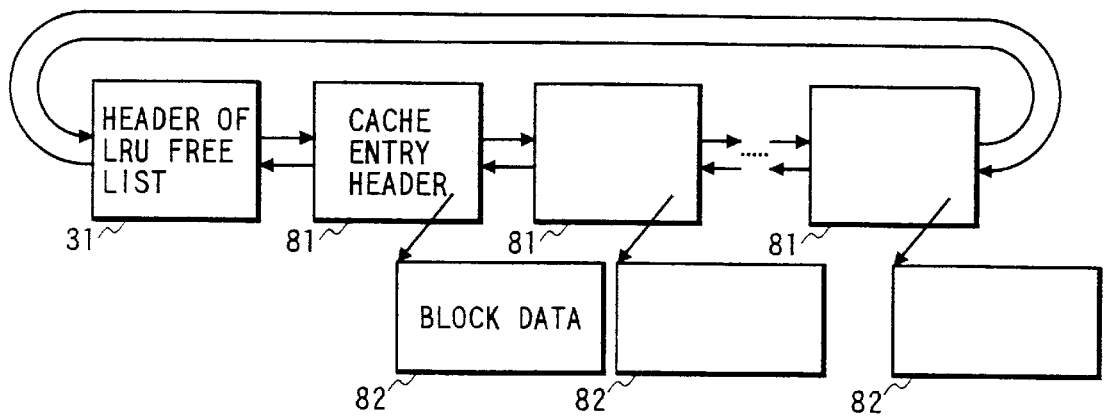
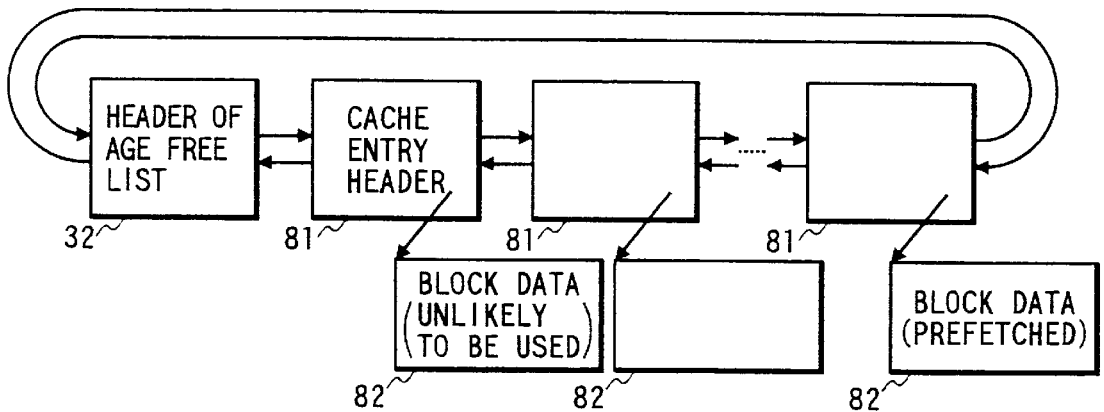
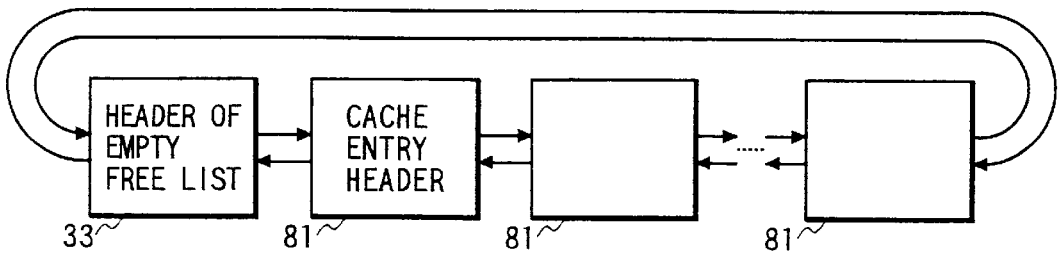

FIG. 7
910 PREFETCH FREE LIST
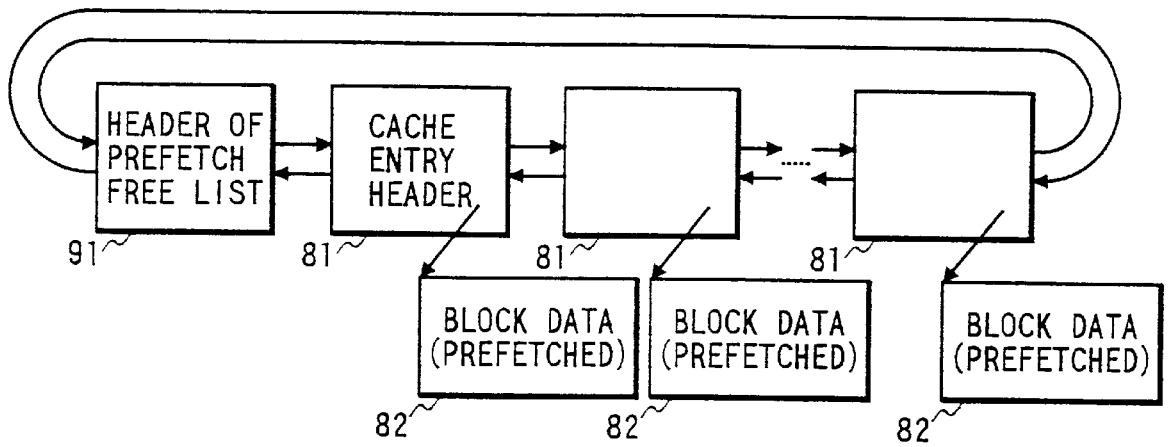
920 UNLIKELY-TO-BE-USED FREE LIST
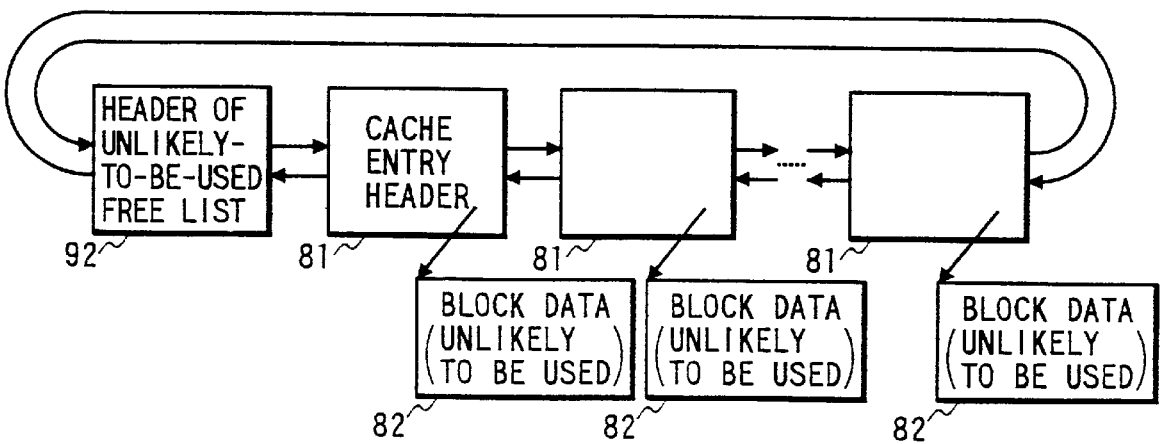

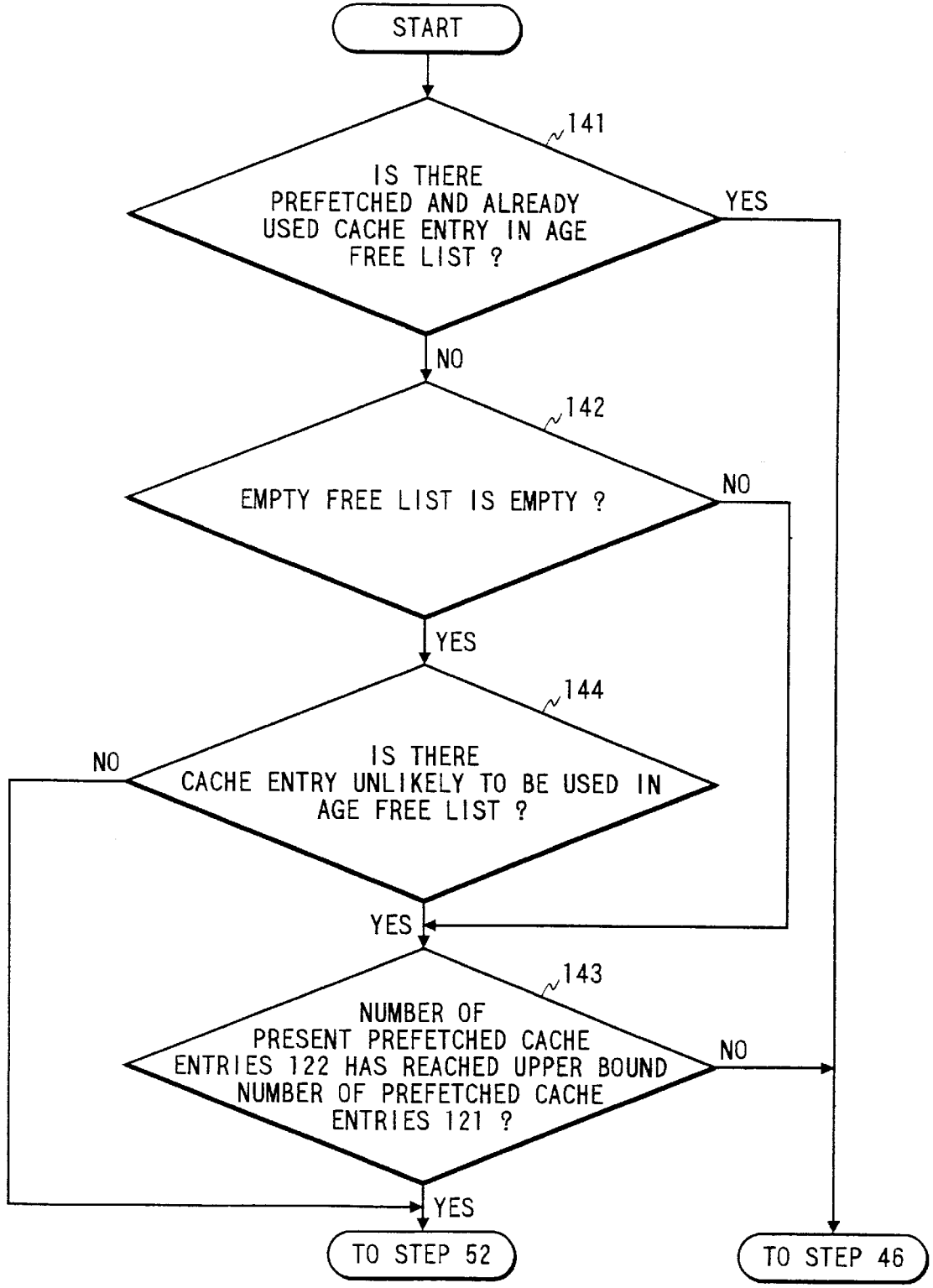

DATA PREFETCH CONTROL METHOD FOR MAIN STORAGE CACHE FOR PROTECTING PREFETCHED DATA FROM REPLACEMENT BEFORE UTILIZATION THEREOF

BACKGROUND OF THE INVENTION

The present invention relates to a method of controlling the prefetch operation by which data is read from the secondary storage device to the cache area provided in the main memory for the processor before the data is requested from a user process. In many usual computer systems, reading of data requested by the user process from or writing the data into the secondary storage device is executed by the operating system (OS) through the cache area provided in the main memory. UNIX (the registered trademark of X/Open Company in the United States of America and other countries) is well known as typical operating system (OS) used in the workstations. Refer to "The Design and Implementation of the 4.3 BSD UNIX Operating System," Addison-Wesley Publishing Company, Inc., pp. 29 to 37, 172 to 177, 191 to 193 and 208 to 211 (1989) (Hereinafter referred to as reference document 1).

Prefetching of data from the secondary storage device is also executed under this OS. That is, when the OS processes the read request from the user process, it judges whether the user process executes the sequential access to the same file, for instance. When it is judged that the user process executes the sequential access, it executes the read request, predicts an I/O request which the user process will issue next and issues the read request of the predicted block to the secondary storage device asynchronously. Next, when the user process issues the read request to this prefetched data, the data is transferred from the cache area to the user process at once. At this time, the prefetch of the next data is further executed. This prefetch is executed concurrently to the processing of the read request requested by this user process. For instance, refer to "Extent-like Performance from a UNIX File System," Proceedings of the Winter 1991, USENIX Conference, pp. 33 to 43, (1991) (Hereinafter referred to as reference document 2).

SUMMARY OF THE INVENTION

As a result of the examination, the present inventors have found that there is a possibility of occurrence of replacement of the prefetched data by other data before the data is used by the user process, according to the prior art prefetch method. When such replacement occurs, prefetching itself becomes useless. In addition, the read performance to the secondary storage device decreases when many useless prefetches occur.

Concretely, when many user processes run at the same time, many files are opened for those processes, and those user processes execute the sequential access almost simultaneously, it can happen that the number of cache entries the operating system is going to use exceeds the total number of the cache entries. That replacement occurs at this time.

It is described, for instance, at page 208 of the reference document 1 that the cache entries of an arbitrary number between 100 to 1000 can be incorporated depending upon the amount of the main memory which can be used. The number of the cache entries is assumed to be 1000 here. Moreover, it is assumed that the amount of data which the user process uses at reading is eight blocks. The amount of the data prefetched at a time is assumed to be seven blocks, from the description of the reference document 2. In that OS, the unit of management of data stored in the secondary storage device is called a logical block. It is assumed here that the size of a logical block is 8 kilobytes. It is further assumed that 60 user processes exist and they generate read requests to separate files at the same time. Under the above-mentioned assumption, the number of cache entries used at the same time becomes 900 (8 blocks×60 files+7 blocks×60 files) entries. This entry number does not exceed the assumed total number 1000 of cache entries. Therefore, it can be expected in the assumed situation that the prefetched data remains on the cache until it is actually used.

However, when the number of files opened at the same time for read operations is more, the number of cache entries which the operating system is going to use will occasionally exceed the total number of cache entries. It is assumed that the number of files read at the same time is, for instance, 120. At this time, the number of cache entries used at the same time becomes 1800 (8 blocks×120 files+7 blocks×120 files). If this number is compared with the assumed cache entry number 1000, a necessary number of entries in the assumed situation becomes more than the total number of cache entries. As a result, when the data of a logical block which includes the read data requested by the user process or the data of the prefetched logical block is stored in the cache, no empty entry or no entry which holds already used data exist in the cache area. According to the prior art management of the cache entries described in the reference document 1, the entry which holds the prefetched data is used in this case to hold the data which the other user process requested even when the prefetched data for this case has not been accessed yet by a user process. Thus, the prefetched data will be replaced by other data before it is used.

The present inventors have found this problem will occur not only when there are many numbers of files read at the same time but also even when the number of files is comparatively few, if the amount of the prefetched data for each file is enlarged. If the number of the user processes which access the files at the same time is decreased to 60, while the prefetched amount of the data is increased to 16 blocks under the above-mentioned assumption, the number of cache entries used at the same time will become 1440 (8 blocks×60 files+16 blocks×60 files). This number of entries exceeds the assumed total number of 1000 cache entries. As a result, it cannot be expected that the prefetched data will remain in the cache until it is actually used.

The object of the present invention is to provide a data prefetch method which can suppress replacement of the prefetched data by other data, before the user process uses it.

A more specific object of the present invention is to provide a data prefetch method which prevents increase of occurrence of replacement of the prefetched data by other data.

Another more specific object of the present invention is to provide a data prefetch method which can prevent occurrence replacement of the prefetched data by other data.

In order to solve the problem, the prefetch control method according to the present invention has the steps of judging whether the read request fills a predetermined prefetch stop condition before executing that prefetching, and stopping that prefetching when that read request fills that condition. Here, that condition is one to avoid replacement of the succeeding data, after the succeeding data is prefetched, by other data which will be read from that secondary storage device into the cache area.

In a more specific mode of the present invention, prefetching is stopped after it is detected that the data already prefetched was replaced by other data in that cache area before the prefetched data is transferred to the user process.

In another specific another mode of the present invention, allocation of the cache area is controlled so as not to allocate the cache area which holds the prefetched data to other data. If the cache area which should be allocated to the prefetched data does not exist, prefetching is stopped.

BRIEF DESCRIPTION OF THE DRAWINGS

FIG. 6 is an explanatory figure of the structure of plural free lists used in the computer system of FIG. 1.

FIG. 7 is an explanatory figure of plural free lists used in the second embodiment of the prefetch control method according to the present invention.

FIG. 11 is a flow chart of the prefetch stop judge processing executed in the third embodiment of the prefetch control method according to the present invention.

DESCRIPTION OF THE EMBODIMENTS

Figure 1:
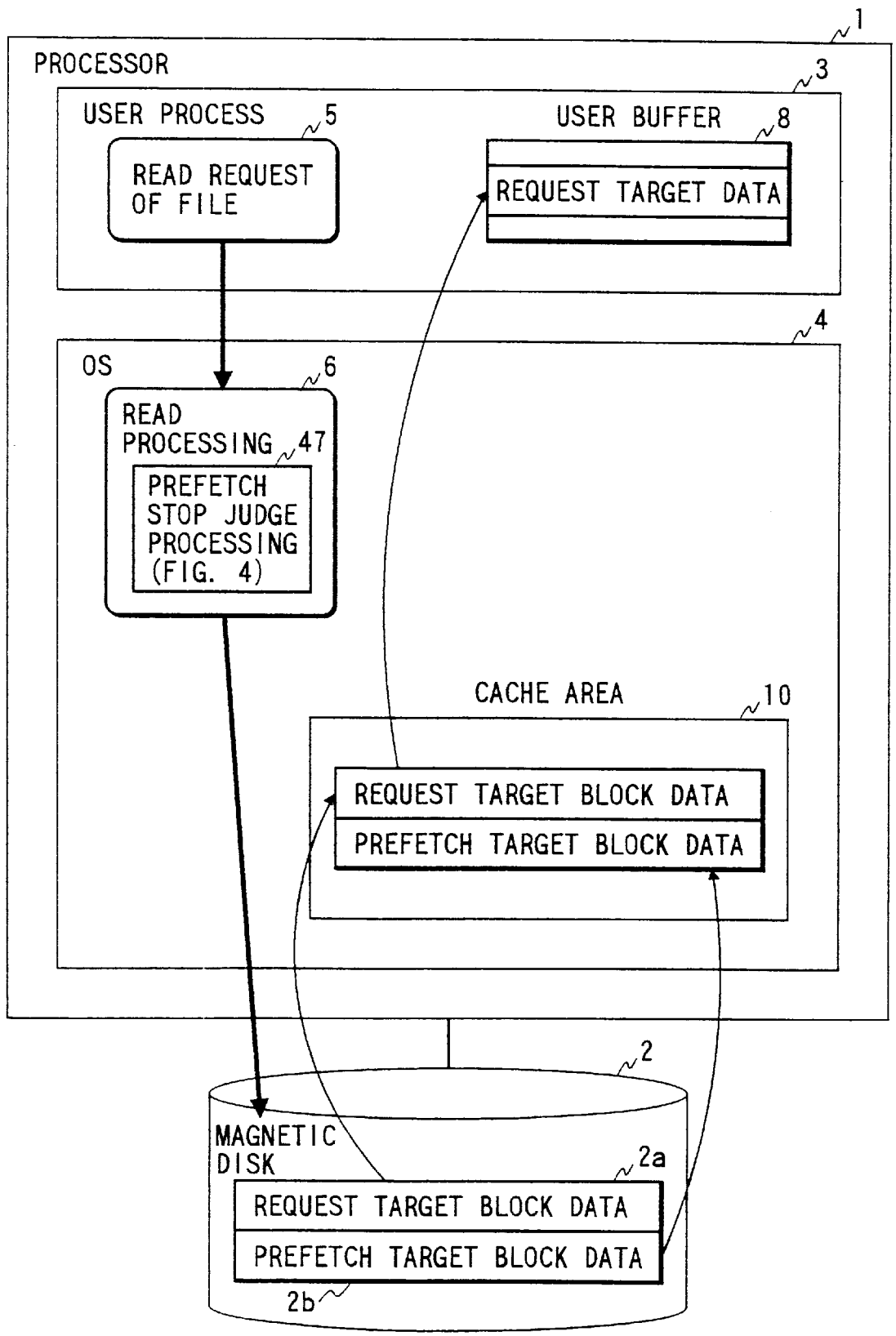
FIG. 1 shows a computer system in which the prefetch control method according to the present invention is executed and the outline of the procedure of the method.

A data prefetch method according to the present invention will be explained in more detail with reference to one or several embodiments or their modifications shown in the drawings. The same or like numerals represent the same or like elements. With the second and other embodiments, the differences between them it and the first embodiment will be mainly explained.

<Embodiment 1>

(1) Outline of the operations

In FIG. 1, the computer system is composed of a processor 1 as an upper device, and a magnetic disk storage device 2 as the secondary storage device. The secondary storage device actually can be composed of plural magnetic disk storage devices or a disk array. The processor 1 is composed of an instruction unit which executes instructions, the main memory, and the storage control unit which controls the main memory, and so on, but these circuits are not shown for the sake of simplicity. Instead, a running user process 3 and the operating system 4 (hereinafter referred to as OS) are shown in the block of the processor 1. Actually many user processes run on the processor 1 at the same time but only one user process 3 is shown in the drawing for the sake of simplicity. The number of these user processes is assumed to be far more than one, for instance, about 60.

When the user process 3 issues a read request 5 to the file within the secondary storage device 2, OS 4 executes the read processing 6. Thus, data 2a (the request target block data) of a logical block which includes the data requested by the user process 3 is read from the magnetic disk storage device 2 and is stored in the cache area 10 which OS 4 manages. Data (the request target data) requested by the user process in the request target block data 2a is transferred to the user buffer 8 which the user process 3 has prepared. The read processing 6 judges whether prefetch corresponding to this read request 5 is to be executed, concurrently to execution of that read request. When prefetching is executed, the data of plural logical blocks is prefetched. This number of prefetched logical blocks is assumed to be considerably larger than one, for instance, about seven blocks. Data (the prefetch target block data) of each prefetched logical block 2b is stored in the cache area 10. Thus, the read processing concerning the read request from the user process 3 ends.

In order to judge whether prefetching is to be executed, the read processing 6 judges whether this read request 5 is a sequential read request. What is characteristic of the present embodiment is not to execute prefetching of the succeeding data of the data requested by this read request at once even when this read request is the sequential read request but rather to judge by the prefetch stop judge processing 47 whether the prefetching is to be stopped. Concretely, the stop judge processing 47 judges whether this read request satisfies the prefetch stop condition that this read request is one for data already prefetched to the cache area 10 and the data has been replaced by other data before the data is used by the user process. When this condition is filled, the prefetch of the succeeding data of the data requested by this read request is stopped. In addition, prefetching is stopped from then on for the sequential read request to this file.

According to the managing method of the cache area 10 adopted by the present embodiment as will be described later on, fulfillment of this condition indicates that the prefetched data was replaced by other data before the prefetched data is used by the user process. So, this prefetching was useless. Fulfillment of such a condition occurs when many files are opened at the same time and many user processes have issued sequential read requests to those files. Therefore, in the present embodiment, prefetching is controlled so as not to execute prefetching after replacement of the prefetched data by other data occurs. Therefore, replacement of the prefetched data by other data occurs once for one file in the present embodiment, but similar useless prefetching of data is prevented from then on.

(2) File management in OS

OS 4 manages plural files in the magnetic disk storage device 2 according to a known procedure except for the execution of the prefetch stop judge processing 47 by using some pieces of new information stored in the i-node as will be described below. Refer to the reference document 1, for instance. Specifically, the user process 3 issues the open system call first, to execute the file I/O.

The OS has the file table 182 which globally manages the plural files held in the magnetic disk storage device 2, plural i-nodes 9 each including information to execute an access from a user process, and the file descriptor table 181 provided for each user process.

When the OS opens the file requested by this system call, the OS generates the i-node 9 to the file. Specifically, the OS reads the i-node stored in the magnetic disk storage device 2 to the main memory. The i-node mentioned below in the present specification refers to the i-node read to the main memory. Afterwards, the OS adds an entry 183 to the file table 182 known per se, adds an entry to the file descriptor table 181 corresponding to the user process 3, and returns the contents of the entry added to this file descriptor table 181 to the user process 3. The content is called the file descriptor and is composed of the pointer to the added entry 183 in the file table 182.

The i-node 9 has the file management information to manage the file such as the owner of the file, the access right of the file, and the size of the file, etc., and the index to a logical block to access a logical block which stores data on the magnetic disk storage device 2, like the known the i-node. Unlike the known i-node, the i-node 9 of the present embodiment further has the final access location 22, the final prefetch location 23, and the prefetch stop flag 24, for the prefetch stop judge processing 47. The final access location 22 and the final prefetch location 23 show the location to which the same user process 3 finally issued the access request to the corresponding file, and the location finally prefetched for the user process 3. The prefetch stop flag 24 is set, when prefetching is prohibited to the corresponding file.

Like the known file table, the entry 183 of the file table 182 includes the number of references from the process, the byte offset within the file which is anticipated as a starting point of the next I/O, the access right (read and write) of the opening processes and the pointer which indicates the i-node 9 of the opened file. This byte offset decides the location to which read or write is executed next in the file. The byte offset in the file table is set, when the file is opened, to 0, for instance, if reading and writing is executed to the head of the file. Moreover, if the user process opens the file in the additional writing mode, the byte offset in the file table is set to the size of the file. The subsequent I/O request from the user process 3 is executed by using a read or write system call. At this time, these system calls include, as an argument, the file descriptor, the buffer address in the space of a user process, and the size of the data. That is, the read or the write system call does not designate the offset in the file at which reading or writing should be executed. When reading or writing of the file data is executed, the byte offset in the file table 182 is updated by only the size of the transferred data. The user process can directly set the byte offset in the file table by the lseek system call.

The advantage with the byte offset of the file provided in the file table 182 is that plural user processes can share the byte offset for the same file or can have separate byte offsets. That is, it is possible to decide the file descriptors of plural entries belonging to plural file descriptor tables 181 for plural user processes so that those plural entries may indicate one entry of the file table 182. In this case, when the file I/O's are executed from those user processes, these user processes can share the same byte offset in this shared entry. Moreover, it is possible to decide the file descriptors of plural entries belonging to plural file descriptor tables 181 for plural user processes so that those plural entries may indicate different entries of the file table 182, and to decide further those different entries 183 in the file table 182, so that those different entries 183 in the file table 182 indicate the i-node 9 for one file. These user processes can have separate byte offsets for the same file in this case.

(3) Data read processing 6

Figure 3:
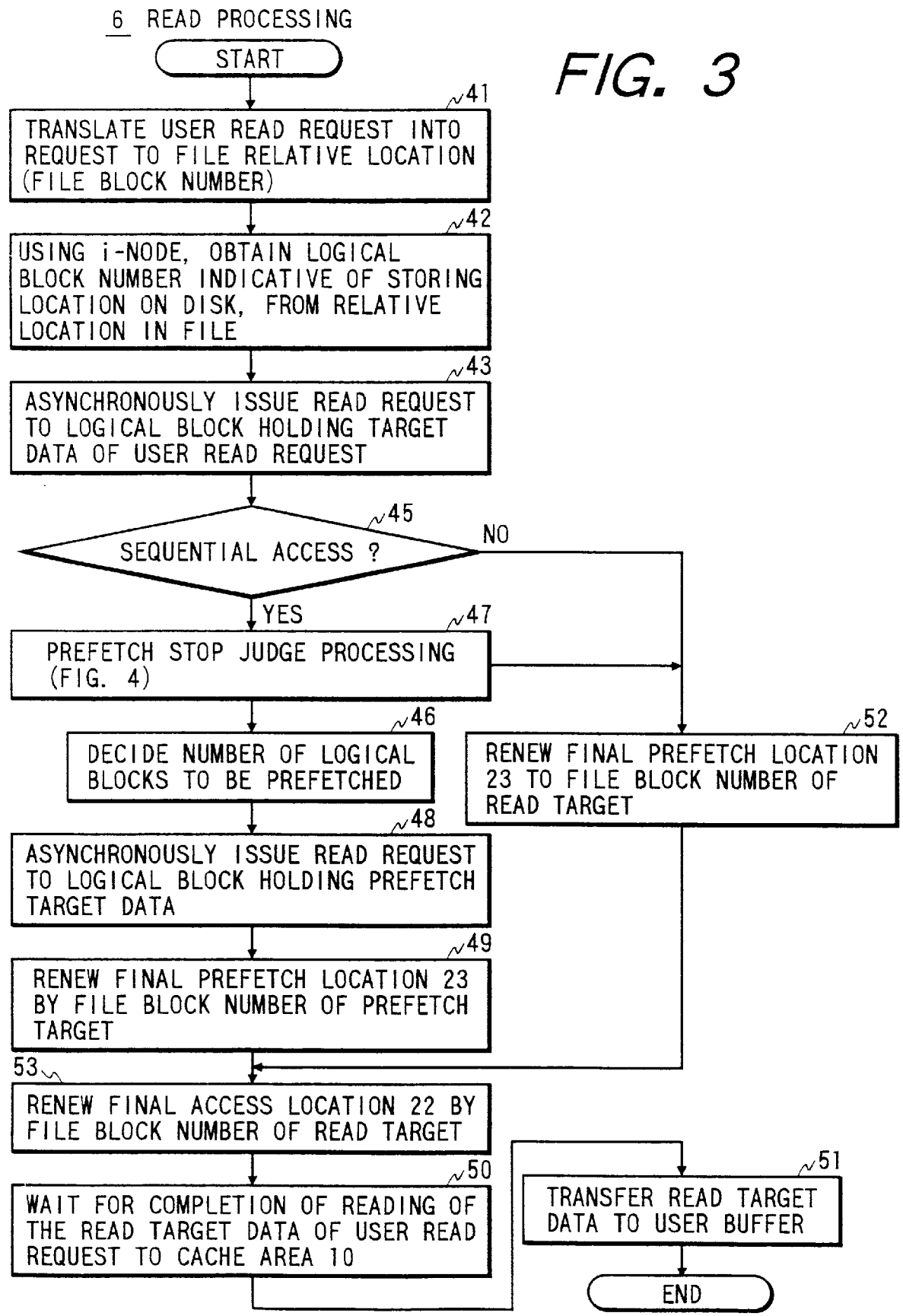
FIG. 3 is a flow chart of the read processing executed in the computer system of FIG. 1.

When the user process 3 issues a read request 5, OS 4 executes the read processing 6. The number of blocks which the user process 3 requests is generally a number considerably larger than one, and is assumed to be about 8 here. Referring to FIG. 3, in the processing 6, the read request from the user is first translated into the file block number which is a relative location of the block in the file (step 41). In addition, the i-node of the corresponding file is judged from the file name designated by the read request 5 from the user process 3. The file block number indicative of the location of the block (file block) in the file designated by the read request 5 is further translated into the logical block number indicative of the storing location on the magnetic disk storage device 2 of the file block, by using the information in the i-node 9 (step 42).

Next, the read request of the request target logical block data which contains the data designated by the read request from the user process is asynchronously issued to the magnetic disk storage device 2 (step 43). A hit check is executed to the cache area 10 to the read request of the request target logical block data by a known method, before the read request of the request target logical block data is issued to the magnetic disk storage device 2. Specifically, the hit check is executed by the following method. The cache entry with the valid data exists in individual hash waiting queues (not shown), hashed as a function of the logical block number. The OS finds a logical block where the request target data is stored, and traces the hash waiting queue based on it. If a logical block is found from the hash waiting queue, it means that the cache has hit. If the cache area 10 hits to this read request, the data held in the hit cache entry is transferred to the user buffer 8 in the user process 3, and the asynchronous read request is not issued. If the cache area 10 does not hit, the cache entry to hold the request target logical block data is searched from the cache area 10 by the method as will be explained later on.

Figure 2:
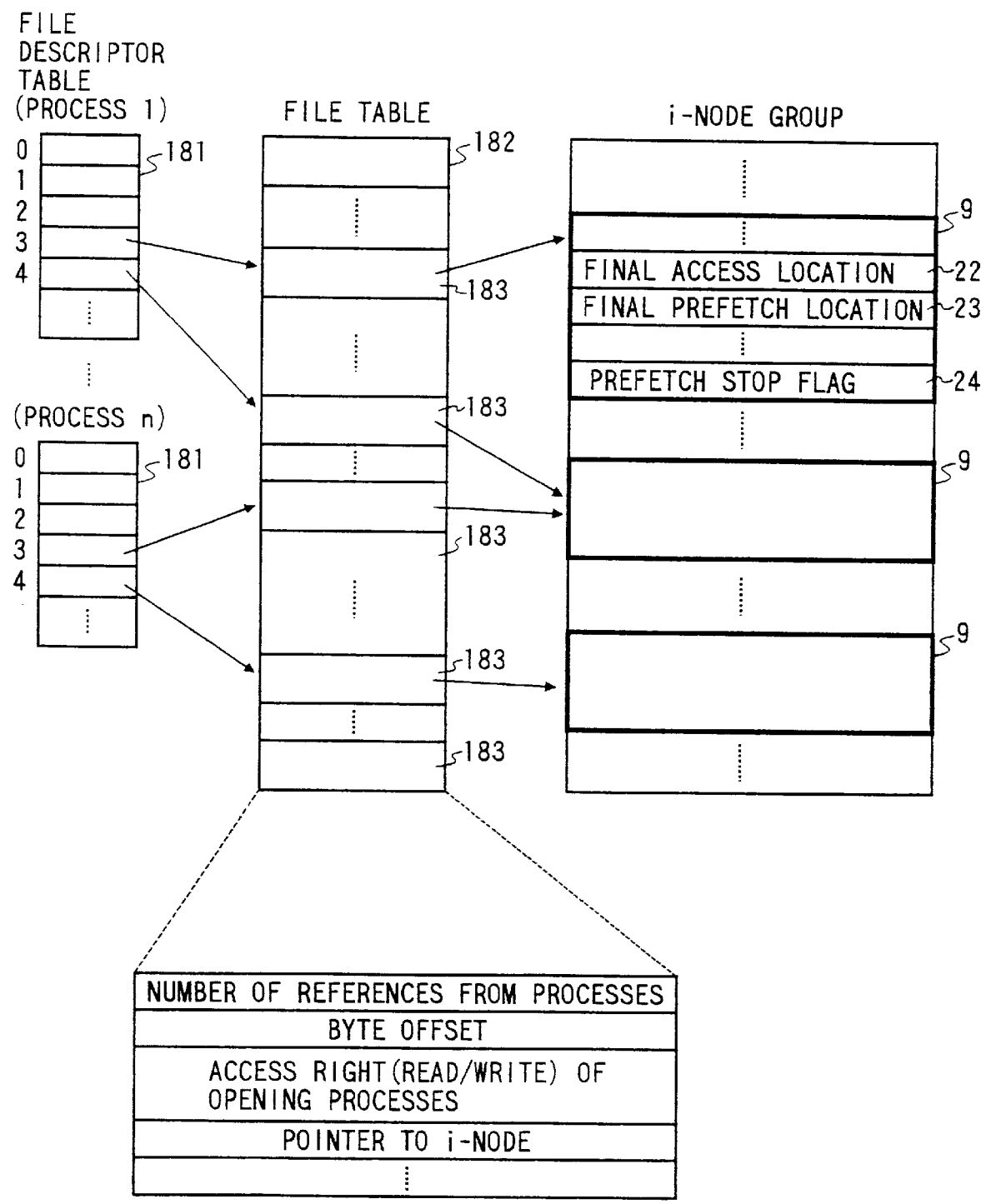
FIG. 2 shows various tables used by the OS controlling the computer system of FIG. 1.

From then on, it is judged whether this read request is a sequential read request (step 45). Whether it is a sequential read request is judged in the present embodiment depending upon whether the present access location is the succeeding address location of the final access location 22 (FIG. 2). Whenever the magnetic disk storage device 2 is accessed by the read request requested from a user process to the file corresponding to the i-node 9, as will be explained later on with step 52 and 53, the number of the last file block accessed by a request is written in the final access location 22. If the read target block is composed of plural blocks, the file block number of the block read last is written. As a result, the present method of judging the sequential access is executed in unit of a file, independently of the number of accessing processes. Therefore, when two user processes alternately access the successive blocks in the same file by different byte offsets respectively, these accesses are not judged to be the sequential access.

When the present read request is judged in step 45 as not being a sequential access, the final prefetch location 23 is updated by the file block number of the request target block (step 52). When the request target block is composed of plural blocks, the file block number of the last block in those blocks is used for this updating. This updating is executed to execute the stop judge processing 47 to a sequential access when the sequential access occurs later on. On the other hand, when the present request is a sequential access, the prefetch stop judge processing 47 is executed, and it is judged whether to execute prefetching. Therefore, prefetching is not executed at once to the sequential access. The prefetch stop judge processing 47 is a characteristic part of the present embodiment, and its details will be explained later on.

When it is judged that prefetching is to be stopped in the prefetch stop judge processing 47, step 52 already described is executed. When it is judged in the prefetch stop judge processing 47 that prefetching is to be executed, the size of the prefetched data (number of prefetch logical blocks) is decided (step 46). This decision is executed as follows whenever the read processing 6 is executed. When the number of logical blocks already prefetched to the file of the access target falls below the predetermined threshold, the number of prefetch logical blocks is set to a predetermined suitable number, and prefetching of plural logical blocks of this number is executed collectively. When the number of logical blocks already prefetched exceeds that threshold, the number of prefetch logical blocks is set to 0. Prefetching in the present read processing is suppressed. In general, in the magnetic disk storage device 2, etc., if the amount of the data input and output at one time becomes larger, the transfer becomes more efficient. That is, if plural blocks are read collectively the frequency of the issue processing of the I/O request and the interrupt processing of the I/O completion by OS decreases, and therefore, the I/O processing time for each amount of data is shortened. In reading plural blocks collectively like this, the technology disclosed at p. 38 of the reference document 2 can be used.

The number of prefetch logical blocks is assumed to be considerably larger than one, for instance, about seven blocks as already described. In this case, the threshold for determining whether to execute prefetching in the present read processing is set to a number of seven or less. For instance, if the threshold is assumed to be one, the prefetching of the succeeding seven blocks is started, when the data of the final prefetched logical block becomes the request target of the user process. Moreover, if the threshold is assumed to be seven, for instance, prefetching of the seven blocks succeeding to the final prefetched logical block is started, when the data of the first prefetched logical block becomes the request target of the user process. To execute prefetching of data of the set number of prefetch logical blocks blocks, a read request of the prefetch target logical block is asynchronously issued to the magnetic disk storage device 2 (step 48). The cache entry to hold this prefetch target data is secured by the method which will be explained later on, before the read request of this prefetch target data is issued.

In addition, the final prefetch location 23 is updated by the file block number of the prefetch target block (step 49). When the prefetch target block is composed of plural blocks, the file block number of the block prefetched last is used for this updating. The final access location 22 is further updated by the number of the file block read last (step 53). Readout of the data of the request target logical block of the user process by the read request executed by step 43 is waited for from the magnetic disk storage device 2 to the cache area 10 (step 50). When this request target logical block data is read, the data is stored in the block data area of the cache entry searched before execution of step 43, as will be explained later on. The request target data of the user process within this block data is transferred to the user buffer 8 (step 51). When this prefetch target block is read, the data is stored in the block data area not shown, of the cache entry secured before execution of step 48, as will be explained later on.

(4) Cache management

Figure 5:
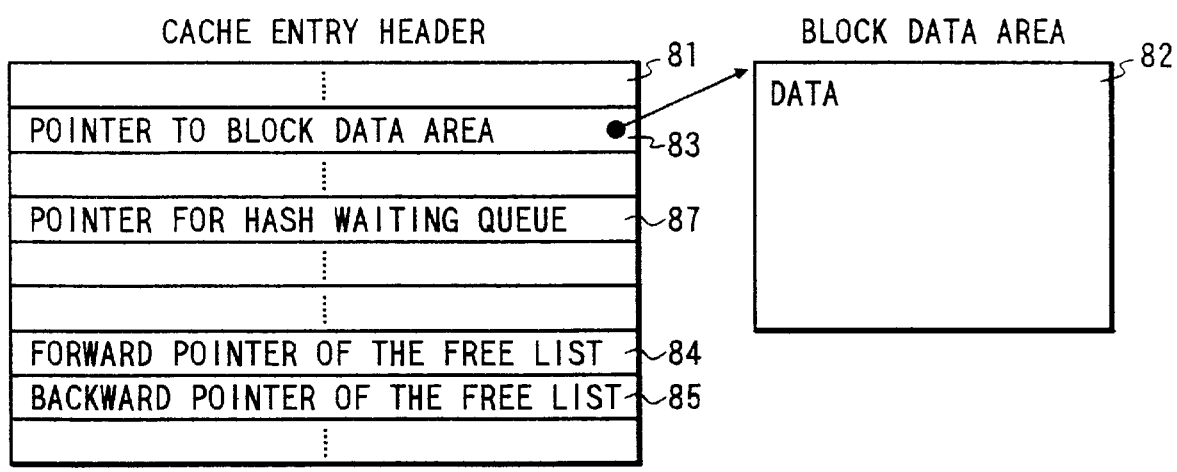
FIG. 5 shows a schematic structure of the cache entry used in the computer system of FIG. 1.

The request target block data 2a and the prefetch target block data 2b are managed in the cache area 10 in the following manner. Plural cache entries are stored in the cache area 10. Each cache entry is composed of the cache entry header 81 and the block data area 82, as shown in FIG. 5. The cache entry header 81 includes the management information of the cache entries, the pointer 83 to the block data area pointing the block data area 82, the pointers 84 and 85 respectively pointing to forward and backward cache entries in one of the free lists which will be explained later on, and the pointer 87 to the hash waiting queue, etc. The hash waiting queue is used for high-speed search of the cache entry. This hash waiting queue is used to check the cache hit, as explained with the above-mentioned step 43. The cache entry is used one for one with a logical block. Therefore, the block data area 82 has the same size as the size of a logical block at its maximum size. As mentioned above, when plural logical blocks are read collectively, cache entries equal in number to the number of logical blocks are needed.

When the OS executes an I/O operation of a logical block data, the OS allocates a cache entry, and holds the data of the logical block in the block data area, to store the data of the logical block. Those plural cache entries are managed by using plural free lists. The free lists used in the present embodiment and the method of managing the cache entries using them are basically the same as those described at pp. 208 to 213 of the reference document 1. The free lists relating to the present embodiment are the-least-recently-used (LRU) free list, the AGE free list, and the EMPTY free list. The LRU free list 310 includes the header of the LRU free list 31 and plural cache entries, as shown in FIG. 6. Each cache entry has the cache entry header 81 and the block data area 82, as described before. The cache entry header 81 is connected to the header of the LRU free list 31 and the block data area 82 is connected to the cache entry header 81. The logical block data which was requested by one of the user processes, and was already transferred to the user process and is likely to be re-used by the user process is registered to the LRU free list 310. The LRU free list 310 manages plural cache entries by the LRU algorithm, as the name indicates. A cache entry is connected at the end of the LRU free list 310, when it is registered to the LRU free list 310. When a new cache entry is required to hold another logical block data and a cache entry connected to the LRU free list 310 is taken out, the cache entry at the head of the LRU free list 310 is taken out. As a result, the LRU free list 310 achieves the LRU algorithm.

The AGE free list 320 includes the header of the AGE free list 32 and plural cache entries. The logical block data likely to be used soon or the logical block data which was requested by a user process and was already transferred to the user process and is unlikely to be re-used by the user process is registered in the AGE free list 320. The data of the logical block likely to be used is typically the prefetched data. The cache entry which holds data already used by the user process and which is unlikely to be re-used is connected to the head of the AGE free list 320. The cache entry which holds the prefetched data is connected to the tail of the list. Whether data is likely to be re-used or not can be judged by a known method. Refer to the reference document 1, p. 212, for instance. Moreover, for instance, when the access from the user process to the end of the data included in one logical block in a sequentially accessed file ends, the logical block data may be judged as one unlikely to be re-used. When only the data before the end of the data included in the logical block has been accessed, the logical block data may be judged as one likely to be re-used.

The last EMPTY free list 330 includes the header of the EMPTY free list 33 and plural cache entries. The EMPTY free list 330 is a list of empty cache entries. The empty cache entry is an entry to which enough physical memory is not allocated in the virtual address space for the block data area. Refer to the reference document 1, p. 211, for instance.

Therefore, the block data areas are not shown in FIG. 6 for sake of convenience.

The cache entries registered in these free lists are managed as follows. In the following, when the cache entry which contains a logical block is registered in the LRU free list 310 or the AGE free list 320, it may be simply said that the logical block is registered in the free list, and when the cache entry is deleted from the free list, it may be simply said that the logical block is deleted from the free list. When a user process issues a data read request, it is first checked whether the data of a logical block which holds the data of the user request target designated by the request is already prefetched. The subsequent cache management differs, depending on the result of this check.

(a) When the data designated by the read request has not been prefetched (a1) When there is a cache entry on the EMPTY free list 330

It is checked whether there is an empty area in the cache area 10 sufficient to hold the data of the logical block designated by the read request. When there is an enough empty area, the area of a size necessary for holding the logical block data is secured from the empty area. The cache entry header 81 registered in the EMPTY free list 330 is taken out for the read request and the secured area is pointed. When the request target data is read from the magnetic disk storage device 2, the request target data is written in the area. The request target data is transferred to the user buffer 8 for the user process 3 of the request source. Transferring of the data in the cache area 10 to the user process 3 will be referred to as the data being used by the user process 3. When the transfer of the data is completed, the data is called as the data having been already used.

Whether there is a possibility that a read request will be issued again by the user process to the logical block data after this transfer is judged by a predetermined known method. The possibility of issue a read request from the same user process later on to the data already used is referred to the likelihood of reuse of the data. If the data is judged to be likely to be re-used, the cache entry which is composed of the cache entry header taken out and the logical block data is connected to the tail of the LRU free list 310. If the data of the logical block is judged to be unlikely to be re-used, the cache entry is connected to the head of the AGE free list 320.

(a2) When there is no cache entry on the EMPTY free list 330

The cache entries registered in the AGE free list 320 are sequentially searched from the head of this list. If a cache entry is registered in this list, the cache entry is deleted from this list. When the request target data is read from the magnetic disk storage device 2, this data is written in the block data area of the deleted the cache entry. Afterwards, this data and this cache entry are processed as in the case (1a). If no cache entry is registered in the AGE free list 320, the cache entry at the head of the LRU free list 310 is deleted from the list and is used. Afterwards, it is the same as in the case already described.

(b) When the requested data is already prefetched and the cache has hit

The hit cache entry registered in the AGE free list 320 is deleted from this list. The data of the logical block of the cache entry is transferred to the user process of the request source. Reading of the data from the magnetic disk storage device 2 is not executed. The processing afterwards is the same as in the case already described.

In the cache managing method mentioned above, no problem will occur as follows, when the number of the user processes which execute read operations is comparatively few or the number of blocks read by the prefetching at one time are comparatively few compared with the total number of cache entries. That is, plural cache entries usually exist at the head of the AGE free list 320 which includes the block data unlikely to be re-used. When the data read requests from various user processes occur, plural cache entries in the EMPTY free list 330 or the cache entries which contain block data unlikely to be re-used and are located at the head of the AGE free list 320 are used for those data read requests. Therefore, when the read request requesting the data of the prefetched logical block connected to the tail of the AGE free list 320 is issued from the user process, before the cache entries are deleted, those prefetched data will be effectively used.

However, the following problem will occur, when the number of processes which execute read operation is large in comparison with the total number of cache entries or the number of blocks read by prefetching at one time is comparatively large. That is, plural cache entries in the EMPTY free list 330 or plural cache entries containing the block data unlikely to be re-used and located at the head of the AGE free list 320 will be exhausted, to data read requests issued from various user processes, before the read request requesting the data of the prefetched logical block connected to the tail of the AGE free list 320 is issued. Therefore, the cache entry which holds the prefetched data will be deleted from the AGE free list 320 for a newly generated read request and will be used to hold the data read for the new read request or other prefetching from the magnetic disk storing device 2. Thus, the block data area which holds the prefetched data will be replaced by the request target block or other prefetch target block. As a result, prefetching becomes useless.

(5) Prefetch stop judge processing 47

Figure 4:
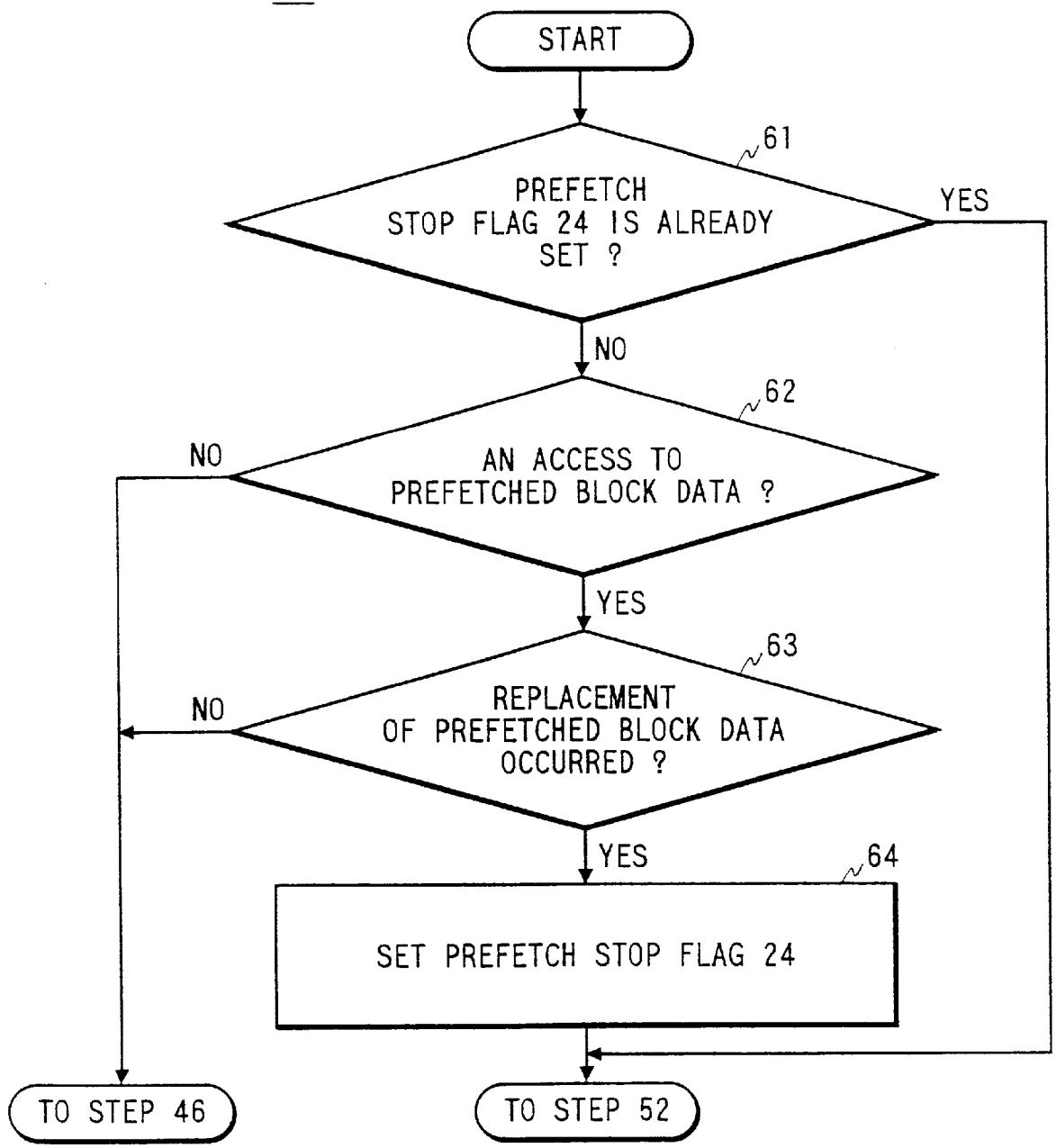
FIG. 4 is a flow chart of the prefetch stop judge processing executed by the read processing of FIG. 3.

The prefetch stop judge processing 47 detects whether such replacement has occurred and controls execution of prefetching for a read request judged to be the sequential access in the sequential access judge processing 45 (FIG. 3), so as not to execute prefetching, when replacement has occurred. In FIG. 4, whether prefetching has already been stopped is judged based on whether the stop flag 24 which will be explained later on is already set in the i-node 9 (FIG. 2) to the file of the access target (step 61). If this flag 24 is already set, the prefetch has already been stopped, so the prefetch stop judge processing 47 ends and step 52 (FIG. 3) is executed. If the prefetch stop flag 24 has not been set yet, whether the read request at this time fills the prefetch stop condition is judged in the following manner. It is first judged whether the data of the request target block of the user process 3 has already been prefetched (step 62). The fact that the data of the request target block of the read request judged to be the sequential access has not been prefetched occurs when the sequential access is the first access of a series of sequential accesses to the same file. This is judged depending upon whether the final prefetch location 23 stored in the corresponding i-node 9 is larger than the address designated by the present read request.

When the data of the request target block has not been prefetched yet, the stop judge processing 47 ends, and steps 46 and 48 (FIG. 3) are executed for prefetching. When the data of the request target has already been prefetched it is judged whether the prefetched data is replaced by the data of other read the request target (step 63). The occurrence of this replacement is judged based upon whether the data of this read request target is in cache area 10, that is, whether cache area 10 hits to the read request target. This hit check is executed by a known method per se.

If the replacement has not occurred, this stop judge processing 47 ends, and prefetching is executed by step 46 and 48 (FIG. 3). If this replacement has occurred, it is judged that the cache entry to hold the request target block data or the prefetch target block data is lacking, and prefetching is stopped. That is, the prefetch stop flag 24 (FIG. 3) in the i-node 9 is set, the stop judge processing 47 ends, and the processing 52 (FIG. 3) for the time when prefetching is not executed is executed. When this flag 24 is set, subsequent prefetching of the file being accessed at present is prohibited by step 61. Thus, when overwriting of the prefetched data occurs and prefetching becomes useless, prefetching of the file which contains the prefetched data can be stopped.

Like the assumption already described, it is assumed here that the number of cache entries is 1000, the amount of the data which the user process uses for reading is 8 blocks, the number of the user processes is 60, the user processes generate the read requests to mutually different files at the same time, and the amount of prefetched data is 16 blocks. At this time, the amount of the cache entries used to hold the request target data of the read requests which the user processes issue becomes 480 (8 blocks×60 files), prefetching will be permitted only to an appropriate number of the user processes to which the replacement of the prefetched data will not occur for the remaining 520 entries. The appropriate number here becomes 520 entries divided by 16 blocks=16, and prefetching is executed to the user processes of this number. Prefetching will not be executed to the remainder 28 user processes. Thus, it is possible to use the 1000 cache entries efficiently.

Thus, the replacement of the prefetched data by other data occurs once in the present embodiment for part of the user processes, but subsequent replacement of the prefetched data can be prevented without changing the prior art cache management algorithm. The prefetched data will not be necessarily used in the future. Therefore, it can happen that the AGE free list 320 will be filled with the prefetched data which is unlikely to be used in the future. In this case, many prefetched data registered in the AGE free list 320 are sequentially replaced by new request target data or the prefetch target data in the present embodiment, so deletion of such useless prefetched data can be executed automatically.

<Modifications of Embodiment 1>

(1) Because the final access location 22, the final prefetch location 23, and the prefetch stop flag 24 of the file are held in the i-node in Embodiment 1, the start and stop of prefetching is controlled for each file, even when plural processes execute I/O operations to one file. However, it is possible to hold these pieces of information in the entry 183 of the file table 182. In this case, different user processes are prohibited from sharing this entry 183. As a result, the start and stop of prefetching can be controlled for each user process even when plural user processes execute I/O operations to the same file. It is also possible to hold these pieces of information in locations other than the file table 182 where these pieces of information can be held separately for each user process.

(2) The other piece of information can be used instead of the final access location 22 and the final prefetch location 23. For instance, the prefetch start location and the amount of prefetching are acceptable. Moreover, only the prefetch start location can be used, if the amount of data to be prefetched can be specified by some separate means.

(3) It is also possible in principle to execute the sequential access judge processing 45 of FIG. 3 for each user process. When it is to be judged for each the user process whether the present access is the sequential access, it is enough to judge whether the present access location in a file by a user process to be successive to the final access location in the file specific to the user process.

(4) It is also possible that for the sequential access judge processing 45 to use information other than the final access location. For instance, the file block number of the present access + the size of the present cluster (a group of blocks) is first stored in the i-node, as described at pp. 35 and 39 of the reference document 2. At the succeeding access, the file block number under access and the stored file block number are compared. If they coincide, the OS judges that the succeeding access is the sequential access.

(5) The prefetch logical block number decision processing 46 in FIG. 3 may dynamically change the number of prefetch logical blocks. For instance, this processing 46 may execute the following control whenever the read processing 6 is executed. Efficient transfer becomes possible in general, if the input and output amount at one time to the magnetic disk storage device 2, etc., is large the possibility is high that the subsequent and further subsequent accesses will be the sequential accesses, when the sequential accesses succeed. Therefore, the number of prefetch blocks can be controlled, so as to increase the number of blocks prefetched collectively. Moreover, in case a non-sequential access is generated after the number of blocks prefetched collectively is increased to those plural successive sequential accesses as mentioned above, it is possible to control the number of blocks prefetched collectively, so as to decrease the increased number of blocks prefetched collectively in preparation for generation of the sequential access again.

<Embodiment 2>

Embodiment 1 detects replacement of the prefetched data by other data and stops prefetching afterwards, but the present embodiment detects whether there is a cache entry which can be used to hold the prefetched data and stops prefetching when it is detected that there is not such a cache entry. The replacement of the prefetched data by other data does not occur in the present embodiment.

The cache management of the present embodiment is different from Embodiment 1 in the following points. In Embodiment 1, both the cache entry which holds the prefetched logical block data and the cache entry which holds the logical block data unlikely to be used are connected to the AGE free list 320, but in the present embodiment, the prefetch free list 910 is used to register the prefetched logical block data and the unlikely-to-be-used free list 920 is used to register the logical block data unlikely to be used are used in place of the AGE free list 320, as shown in FIG. 7. 91 and 92 are the headers of respective lists. When the logical block data held by the cache entry chained to the prefetch free list 910 becomes the target of the user read request, the cache entry is removed from the prefetch free list 910 and the data is transferred to the user process. Afterwards, the cache entry is connected to the LRU free list 310 or the unlikely-to-be-used free list, depending on whether the data is likely to be re-used. The unlikely-to-be-used free list 920 chains the cache entries which hold the data transferred to the user processes by the read processing 6 and judged to be unlikely to be re-used.

The cache entry used to hold the logical block data which contains the request target data designated by the read request from the user process 3 is searched from the EMPTY free list 330, and, when the list is empty, the cache entry is further searched from the unlikely-to-be-used free list 920. Only when these two lists are empty, the cache entry at the head of the LRU free list 310 is used. The prefetch free list 910 is not searched for this request target logical block. The search for the cache entry at this time is similar to the case where only the unlikely-to-be-used free list 920 is used instead of the AGE free list 320 in Embodiment 1. On the other hand, the cache entry used to hold the prefetched logical block data is first searched from the EMPTY free list 330, similarly, and is further searched from the unlikely-to-be-used free list 920. However, even when these free lists 330 and 920 are empty, the LRU free list 310 is not searched. The cache entry to hold the prefetched logical block data is not allocated and prefetching is not executed. The search for the cache entry to the prefetched data is executed in step 48 in Embodiment 1, but is executed by the prefetch stop judge processing 47 in the present embodiment, as follows.

Figure 8:
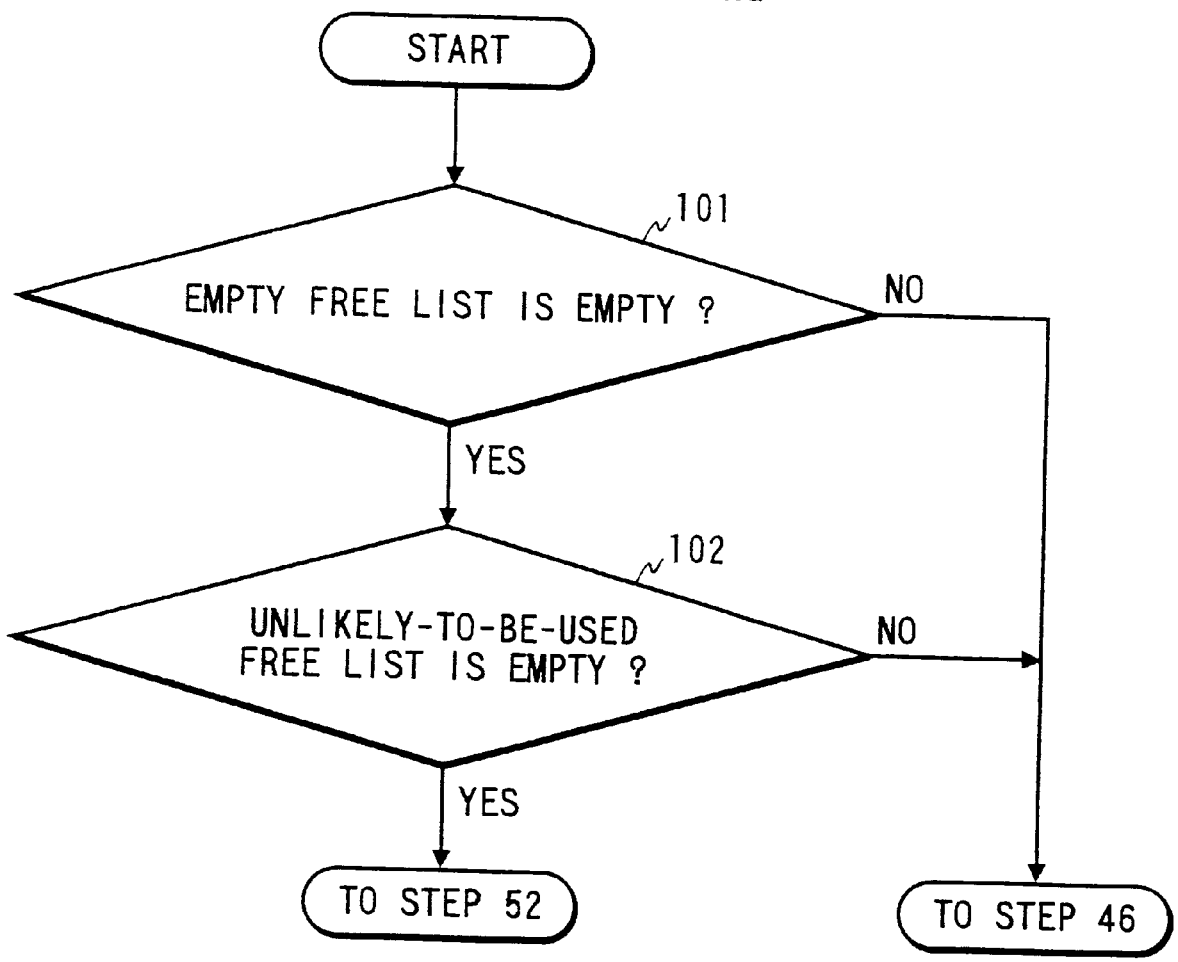
FIG. 8 is a flow chart of the prefetch stop judge processing executed in the second embodiment of the prefetch control method according to the present invention.

In the present embodiment, the prefetch stop judge processing 47 is executed according to FIG. 8. It is detected whether the EMPTY free list 330 is empty (step 101). If the EMPTY free list 330 is not empty, prefetching is executed ((step 46) (FIG. 3)). When the cache entry is taken out of the list 330, and the prefetched data is read from the magnetic disk storage device 2, the data is stored in the taken out cache entry. After the prefetched data is transferred to the user process 3, the cache entry is unconditionally connected to the unlikely-to-be-used free list 920. If the list 330 is empty, it is detected whether the unlikely-to-be-used free list is empty (step 102). If the free list 920 is not empty, prefetching is executed ((step 46 (FIG. 3)), and the cache entry in the free list 920 is used to hold the prefetched data. If this list 920 is empty, it is judged that there is no cache entry which can be secured for prefetching, and prefetching is not executed. As is clear from above, in the present embodiment, the prefetch stop judge processing 47 does need to use the final prefetch location 23 and the prefetch flag 24 stored in the i-node. However, the final prefetch location 23 is used by step 48 (FIG. 3) to decide the location from which to start the succeeding prefetching.

There is no guarantee that the prefetched data registered in the prefetch free list 910 will be used without fail in the future by the user process. Therefore, it is expected in the present embodiment that a situation will be generated where most of the cache areas are full of the prefetched logical block data which is unlikely to be used in the future. Therefore, separate control is executed in the present embodiment such that the cache entry which holds the prefetched data and keeps to be registered in the prefetch free list 910 is released, when time not less than a fixed time has elapsed after prefetching.

Thus, prefetching is executed only when there is a cache entry in the EMPTY free list 330 or in the unlikely-to-be-used free list 920, and the total amount of the prefetched data is limited. On the other hand, even when a cache entry to hold the data of the request target designated by the read request issued by the user process cannot be searched from the EMPTY free list 330 or the unlikely-to-be-used free list 920, the cache entry is not searched from the prefetch free list 910. Therefore, it does not occur that prefetched data will be replaced by the request target data later on, unlike Embodiment 1.

Like the assumption already described, it is assumed here that the number of cache entries is 1000, the amount of the data which the user process uses for reading is 8 blocks, the number of the user processes is 60, the user processes generate the read requests to mutually different files at the same time, and the amount of prefetched data is 16 blocks. At this time, the amount of the cache entries used to hold the request target data of the read requests which the user processes issue becomes 480 (8 blocks×60 files), prefetching will be permitted only to an appropriate number of the user processes to which the replacement of the prefetched data will not occur for the remaining 520 entries. The appropriate number here becomes 520 entries divided by 16 blocks=16, and prefetching is executed to the user processes of this number. Prefetching will not be executed to the remainder 28 user processes. Thus, it is possible to use the 1000 cache entries efficiently. At this time, in the present embodiment, prefetching is executable for 1000 entries/(8 blocks+16 blocks)=41 user processes as in the prior art, due to a read operation of each process. However, prefetching will be executed for the other user processes after a cache entry which has become unlikely to be used is registered in the unlikely-to-be-used free list 920. Thus, it is possible to use 1000 cache entries efficiently so as not to generate replacement of the prefetched data. Moreover, when a cache entry used to hold the prefetched data is selected, it is enough to examine only the EMPTY free list 330 and the unlikely-to-be-used free list 920. Therefore, the prefetch stop judge processing becomes high-speed.

<Embodiment 3>

The present embodiment assures that the prefetched data will not be replaced by the request target data later on, like Embodiment 2. Embodiment 2 uses the prefetch free list 910 which registers only the cache entries used to hold the prefetched data and the unlikely-to-be-used free list 920 which registers only the cache entries used to hold the data unlikely-to-be-used, and prevents the replacement by searching the cache entry to hold the request target data designated by the read request from the user process from the lists 310, 330, and 920 other than the list 910. However, in the present embodiment a flag which shows the data held in each cache entry is prefetched data is given in each cache entry, and when a cache entry to hold the request target data designated by the read request from the user process is searched, the cache entry which has the flag which does not indicate that the cache entry holds prefetched data is searched. In addition, Embodiment 2 limits the cache entry used to hold the prefetched data to the cache entry which exists on the specific free lists 330 and 920, thereby limiting the number of the cache entries used to hold the prefetched data. On the other hand, the present embodiment makes an actual number of the cache entries which hold the prefetched data below the predetermined upper bound value.

Figure 9:
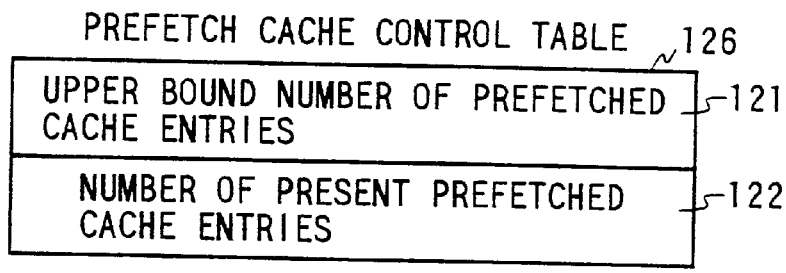
FIG. 9 shows plural pieces of information held in the prefetch cache control table executed in the third embodiment of the prefetch control method according to the present invention.

In the present embodiment, OS 4 prepares the prefetch cache control table 126 beforehand, as shown in FIG. 9. This table 126 is composed of the upper bound number of prefetched cache entries 121 and the number of present prefetched cache entries 122. When the read request to the prefetched data is newly issued to the magnetic disk storage device 2 in step 48 (FIG. 3), attributes of plural cache entries prepared to hold the data are examined, and the number of present prefetched cache entries 122 is counted up by the number of cache entries which have been used anew to hold prefetched data, among the plural cache entries. Moreover, when the plural cache entries used a new to hold prefetched data are used later on to hold other data, the number of present prefetched cache entries 122 will be counted down by the number of the cache entries used to hold other data.

Figure 10:
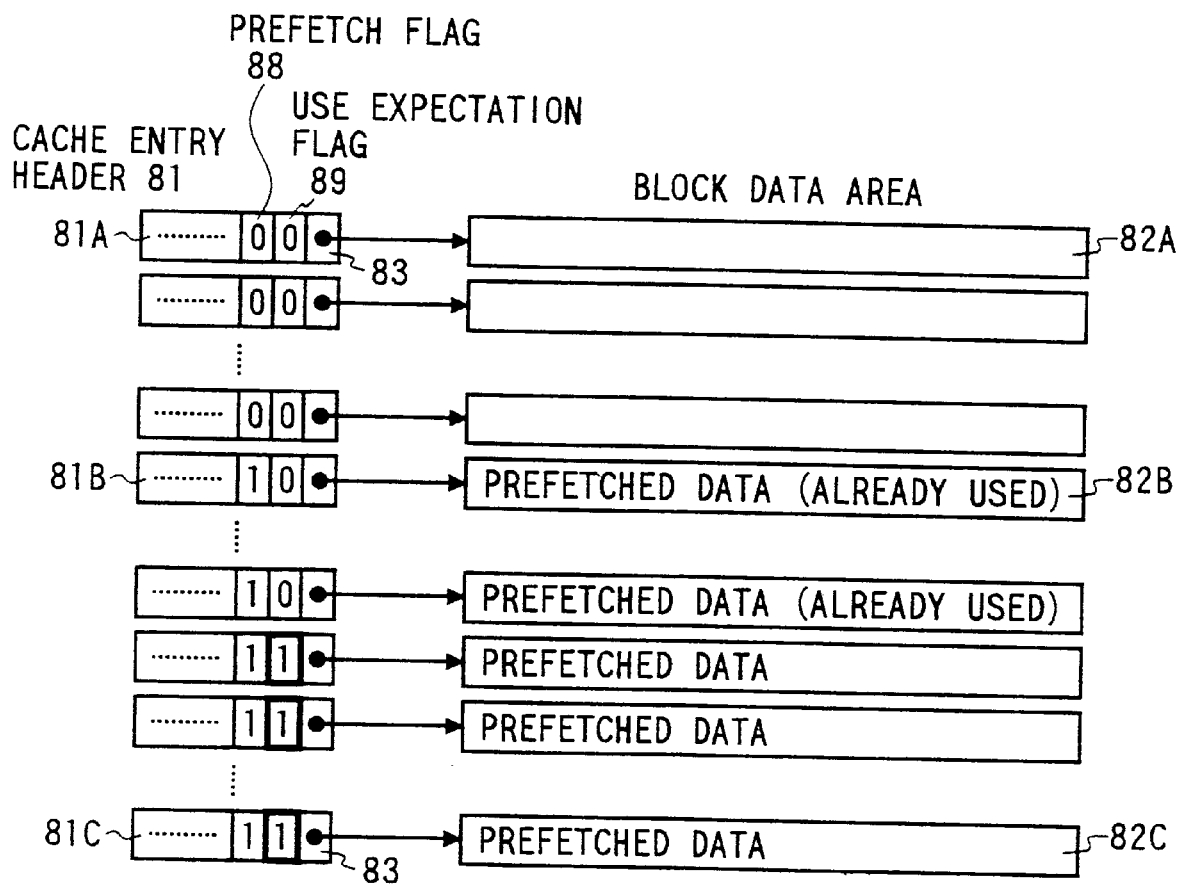
FIG. 10 shows a schematic structure of the cache entry used in the third embodiment of the prefetch control method according to the present invention.

In the present embodiment, the prefetch flag 88 and the use expectation flag 89 are further added to each cache entry header 81, as shown in FIG. 10. This prefetch flag 88 is set when the cache entry holds the prefetched data, and is reset when the cache entry holds the request target data requested by the user process. The use expectation flag 89 is set, when the cache entry holds the prefetched data. The use expectation flag 89 is reset, when the read request to the data is issued from the user process 3 later on, the data is transferred to the user buffer 8 and the data is judged as one already used that is, as one unlikely to be re-used.

In the present embodiment, the LRU free list 310, the AGE free list 320, and the EMPTY free list 330 are used like Embodiment 1, and the kinds of the cache entries connected to each of the LRU free list 310 and the AGE free list 320 are also the same as in Embodiment 1. As the cache entry to hold the request target logical block data designated by the read request issued by the user process 3, the cache entry registered in the EMPTY free list 330 is first searched like Embodiment 1, and when the cache entry does not exist, the AGE free list 320 is searched. However, the search from this AGE free list 320 differs from Embodiment 1 in that the cache entry which holds data unlikely to be used or the cache entry which holds the already used prefetched data is searched.

Here, the data unlikely to be used 82A is the data held in the cache entry header 81A where the prefetch flag 88 is reset. The already used prefetched data (, that is, prefetched data unlikely to be re-used) 82B is the data held in the cache entry header 81B where the prefetch flag 88 is set and the use expectation flag 89 is reset. Therefore, the data 82C held in the cache entry header 81C where the prefetch flag 88 is set and the use expectation flag 89 is set is not included in the search target in the search with this AGE free list 320. As a result, the data prefetched and not used for the user process yet is not replaced by the request target data.

On the other hand, the cache entry to hold the prefetched logical block data is searched in the prefetch stop judge processing 47, as follows, unlike Embodiment 1 and is not searched in step 48 (FIG. 3). In FIG. 11, the cache entry which holds prefetched already used data is first searched in the AGE free list 320. That is, the cache entry where the prefetch flag 88 is set and the use expectation flag 89 is reset is searched (step 141). If such a cache entry exists, the cache entry is used for prefetching. Step 46 (FIG. 3) is executed for execution of the prefetching. If such a cache entry does not exist, it is examined whether the EMPTY free list 330 is empty (step 142).

When this list 330 is empty, it is judged whether there is a cache entry which holds the logical block data unlikely to be used, in the AGE free list 320 (step 144), that is, the cache entry with the reset prefetch flag 88. If there is no such cache entry, prefetching is not executed and step 52 (FIG. 3) is executed.

When it is judged that the EMPTY free list 330 is empty in step 142, or when it is judged in step 144 that there is a cache entry which holds the logical block data unlikely to be used, it is judged whether the number of present prefetched cache entries 122 has reached the upper bound number of prefetched cache entries 121. If the upper bound number of present prefetched cache entries 122 has reached the number of prefetched cache entries 121, step 53 is executed without executing prefetching. If the number of present prefetched cache entries 122 has not reached the upper bound number of prefetched cache entries 121, a cache entry of the EMPTY free list 330 searched in step 142 or the cache entry of the AGE free list 320 searched in step 144 is used for the prefetched data. Step 46 is executed, to execute prefetching.

The upper bound number of prefetched cache entries can be suitably decided for each system. For instance, in order to acquire the same effect as that shown in Embodiment 2, it is enough to make the upper bound number of prefetched cache entries be 520 (1000 entries–8 blocks×60 files). In this case, the prefetching for 32 files (520 entries/16 blocks) becomes possible.

Thus, the data which has been prefetched also with the present embodiment is prevented from being replaced by the request target data afterwards. In addition, the total of the cache entries by which the prefetched data are held is limited to a number equal to or less than a number which the OS has set. Moreover, in Embodiment 2 it was necessary to prepare the specific free list to register the prefetched data, but the present embodiment does not need such a specific free list.

The present invention is not limited to embodiments described above but can be realized by the already described modifications of Embodiment 1 and other modifications. Moreover, the sequential access in above-mentioned embodiments is a series of accesses which access plural blocks in the successive addresses. However, the operation which accesses the blocks of these successive addresses every predetermined number of blocks can also be regarded as the sequential access. In addition, more generally, the access operation which sequentially accesses plural logical blocks arranged according to a certain rule can be regarded as the sequential access. The present invention can be applied also to this general sequential access.

According to the present invention, the useless operation that the prefetched data is replaced by other data is diminished or abolished.

What is claimed is:

1. In a computer system which comprises a processor, a memory, and at least one secondary storage device for holding a plurality of files accessible by a plurality of user processes;

wherein said memory includes a cache area for temporarily holding data to be transferred between said secondary storage device and said plurality of user processes;

wherein said computer is constructed so as to read data designated by a read request issued by one of said plurality of user processes from one of said plurality of files, transfer to said one user process by way of said cache area, and so as to prefetch succeeding data to said cache area, when said read request is one for a sequential access which sequentially accesses a plurality of sequentially ordered data in said one file, wherein said succeeding data is one likely to be read by said sequential access, a prefetch control method, comprising the steps of:

judging whether said read request satisfies a predetermined prefetch stop condition before execution of said prefetching, in case said read request is one for a sequential access; and stopping said prefetching of said succeeding data when said read request satisfies said condition;

wherein said condition is one to avoid replacement of said succeeding data by other data which will be read from said secondary storage device later on, before said succeeding data is transferred to the user after said succeeding data is prefetched.

2. A prefetch control method according to claim 1, wherein said computer system is composed so as to select data areas respectively to store said read succeeding data and said prefetched data, according to a predetermined data area selection procedure;

wherein said condition is predetermined, depending on said data area selection procedure.

3. A prefetch control method according to claim 1, wherein said condition is one to avoid replacement of said prefetched succeeding data by either one of first and second data, in case said succeeding data is prefetched;

wherein said first data is other data which will be read from said secondary storage device to said cache area in response to other read request which one of said plurality of said user processes will issue after said prefetching of said succeeding data;

wherein said second data is further other data which will be prefetched from said secondary storage device to said cache area, in response to said other read request.

4. In a computer system which comprises a processor, a memory, and at least one secondary storage device for holding a plurality of files accessible by a plurality of user processes;

wherein said memory includes a cache area for temporarily holding data to be transferred between said secondary storage device and said plurality of user processes;

wherein said computer system is constructed so as to read data designated by a read request issued by one of said plurality of user processes from one of said plurality of files, transfer to said one user process by way of said cache area, and so as to prefetch succeeding data to said cache area, when said read request is one for a sequential access which sequentially accesses a plurality of sequentially ordered data in said one file, wherein said succeeding data is one likely to be read by said sequential access, a prefetch control method, comprising the steps of:

detecting whether data already prefetched from said secondary storage device to said cache area in response to one data read request already issued by one user process has been replaced in said cache area by other data before said already prefetched data is transferred to said one user process; and stopping execution of prefetching of data for a read request for a sequential access issued by one of said plurality of user processes when it is detected that said already prefetched data has been replaced by other data before said already prefetched data is transferred to said one user process.

5. A prefetch control method according to claim 4, wherein said detecting step is executed in response to said read request for a sequential access issued by said one user process.

6. A prefetch control method according to claim 5, wherein said detecting step is executed with respect to data already prefetched from a file held in said secondary storage device to which data requested by said read request for a sequential access belongs.

7. A prefetch control method according to claim 5, wherein said detecting step is executed with respect to data requested by said read request for a sequential access, when said requested data is data already prefetched from said secondary storage device to said cache area.

8. A prefetch control method according to claim 5, further comprising the steps of:

setting a prefetch stop flag predetermined in correspondence to one of said files to which said replaced data belongs, when said prefetching is stopped by said stopping step;

detecting whether said flag is set, when a succeeding read request to said one file for a sequential access is issued from one of said plurality of user processes; and stopping prefetching of a further succeeding data of data requested by said succeeding read request, without executing said detecting step for said succeeding read request for a sequential access, when said flag is set.

9. A prefetch control method according to claim 5, wherein said detecting step includes the steps of:

detecting whether said read request issued by said one user process is a read request for a sequential access;

detecting whether said data requested by said read request has already been prefetched from said secondary storage device to said cache area, when said read request issued by said one user process is a read request for a sequential access; and detecting whether said data requested by said read request exists in said cache area, when said data has already been prefetched from said secondary storage device to said cache area.

10. In a computer system which comprises a processor, a memory, and at least one secondary storage device for holding a plurality of files accessible by a plurality of user processes;

wherein said memory includes a cache area for temporarily holding data to be transferred between said secondary storage device and said plurality of user processes said cache area including a plurality of data areas;

wherein said computer system is constructed so as to read data designated by a read request issued by one of said plurality of user processes from one of said plurality of files, transfer to said one user process by way of one of said plurality of data areas, and so as to prefetch succeeding data to one of said plurality of data areas, when said read request is one for a sequential access which sequentially accesses a plurality of sequentially ordered data in said one file, wherein said succeeding data is one likely to be read by said sequential access, a prefetch control method, comprising the steps of:

selecting a data area within said cache area other than a data area which holds prefetched data not yet used from said cache area, as a first data area to hold said requested data, before executing said reading of said data requested by said one read request from said secondary storage device; and selecting a data area within said cache area other than a data area which holds prefetched data not yet used from said cache area, as a second data area to hold said succeeding data, before executing said prefetching of said succeeding data, when said one read request is one for a sequential access;

wherein said prefetched data not yet used is one which has already been prefetched to said cache area in response to a data read request for a sequential access already issued by a user process but has not yet been transferred to a user process;

wherein said step of selecting said first data area comprises a step of selecting said first data area from a data area of a first kind, a data area of a second kind and a data area of a third kind;

wherein said step of selecting said second data area comprises a step of selecting said second data area from a data area of said second kind and a data area of said third kind;

wherein said data area of said first kind holds data of a first predetermined kind other than prefetched data not yet used;

wherein said data area of said second kind holds data of a second predetermined kind other than prefetched data not yet used;

wherein said data area of said third kind is a data area which is not used to hold data yet;

wherein said method further includes a step of stopping prefetching of said succeeding data, when there is neither a data area of said second kind nor a data area of said third kind in said cache area.

11. A prefetch control method according to claim 10, wherein data of said first kind is one which has already been read from said secondary storage device to said cache area, has been transferred to one user process and is likely to be re-used by said one user process;

wherein said transferring of said data to said one user process has been executed in response to one read request issued by said one user process, and said data has been read from said secondary storage device in response to said one read request as data requested thereby, or has been prefetched from said secondary storage device in response to another read request for a sequential access issued by another user process;

wherein data of said second kind is one which has already been read from said secondary storage device to said cache area in response to a read request already issued by a user process, has been transferred to a user processing response to a read request issued afterwards by said user process, and is unlikely to be re-used by said user process which issued said read request issued afterwards.

12. A prefetch control method according to claim 10, wherein said step of selecting said second data area comprises a step of selecting said second data area from a data area of said second kind, a data area of said third kind, and a data area of a fourth kind, wherein said data area of said fourth kind holds data of a fourth predetermined kind which is different from prefetched data not yet used;

wherein said stopping step comprises a step of stopping prefetching of said succeeding data, when there is none of a data area of said second kind, a data area of said third kind and a data area of said fourth kind in said cache area.

13. A prefetch control method according to claim 12, wherein data of said first kind is one which has already been read from said secondary storage device to said cache area, has been transferred to a user process and is likely to be re-used by said user process;

wherein said transferring of said data to said one user process has been executed in response to one read request issued by said one user process, and said data has been read from said secondary storage device in response to said one read request as data requested thereby, or has been prefetched from said secondary storage device in response to another read request for a sequential access issued by another user process;

wherein data of said second kind is one which has already been prefetched from said secondary storage device to said cache area in response to a read request for a sequential access already issued by a user process, has been transferred to a user process in response to a read request issued afterwards by said user process, and is unlikely to be re-used by said user process which issued said read request issued afterwards;

wherein data of said fourth kind is one which has been requested by a read request already issued by a user process, has already been read from said secondary storage device to said cache area in response to said read request, has been transferred to said user process and is unlikely to be re-used by said user process.

14. A prefetch control method according to claim 13, further comprising the steps of:

detecting whether a number of prefetch data areas has reached a predetermined limit value, when a data area of second kind does not exit in said cache area, but either a data area of said third kind or a data area of said fourth kind exists in said cache area; and stopping execution of said selecting step of said second said data area and stopping said prefetching of said succeeding data, when said number of said prefetch data areas has reached said limit value.

\* \* \* \* \*